US008054572B2

(12) United States Patent
Brume et al.

(10) Patent No.: US 8,054,572 B2
(45) Date of Patent: Nov. 8, 2011

(54) DATA STORAGE DRIVE OVERWRITE PROTECTION OF NON-WORM CARTRIDGES

(75) Inventors: Shawn Owen Brume, Tucson, AZ (US); Kevin Dale Butt, Tucson, AZ (US); Hirokazu Nakayama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 12/549,237

(22) Filed: Aug. 27, 2009

(65) Prior Publication Data

US 2011/0051278 A1 Mar. 3, 2011

(51) Int. Cl.
*G11B 19/04* (2006.01)
(52) U.S. Cl. ............ 360/60; 360/31; 369/53.21
(58) Field of Classification Search .......... None
See application file for complete search history.

(56) References Cited

U.S. PATENT DOCUMENTS

| 6,339,810 | B1 | 1/2002 | Basham et al. ............ 711/111 |
| 6,377,526 | B1 | 4/2002 | Vining et al. ............ 369/53.1 |
| 6,950,257 | B1 | 9/2005 | Greco et al. ............ 360/48 |
| 7,224,545 | B2 | 5/2007 | Saliba et al. ............ 360/69 |
| 7,441,075 | B2 | 10/2008 | Evans et al. ............ 711/111 |
| 7,469,314 | B2 * | 12/2008 | Dahman et al. ............ 711/111 |
| 7,694,096 | B2 * | 4/2010 | Haustein et al. ............ 711/163 |
| 2006/0002246 | A1 | 1/2006 | Emberty et al. ............ 369/30.03 |

FOREIGN PATENT DOCUMENTS

WO 2007/045630 A2 4/2007
* cited by examiner

*Primary Examiner* — Jason Olson
(74) *Attorney, Agent, or Firm* — John H. Holcombe

(57) ABSTRACT

Protection against data overwrite of a rewritable non-WORM data storage cartridge is provided by a data storage drive operating cartridge data overwrite protection procedures independent of, or not withstanding, the absence of cartridge controls relating to data overwrite protection. Also for the non-WORM cartridge, the drive responds to an allow data overwrite command to allow an immediately subsequent write type command to write to the cartridge even if the write command overwrites existing data. The overwrite protection procedures and data overwrite procedures may be configured and enabled for the data storage drive.

25 Claims, 4 Drawing Sheets

DATA STORAGE DRIVE OVERWRITE PROTECTION OF NON-WORM CARTRIDGES

DOCUMENTS INCORPORATED BY REFERENCE

Commonly assigned U.S. Pat. Nos. 6,982,846 and 7,193,803 are incorporated for their showing of data storage cartridges having rewritable media, but with tamper resistant cartridge controlled write once recording thereof. Commonly assigned U.S. Pat. No. 6,339,810 is incorporated for treating rewritable data storage media as write once by automatically advancing a write append limiter and operating the data storage drive to prevent changes to the data occurring before the write append limiter, and commonly assigned U.S. Pat. No. 7,469,314 provides pointers at both the media and a cartridge memory to guard against tampering.

FIELD OF THE INVENTION

This invention relates to data storage with respect to data storage drives and data storage cartridges, and more particularly to overwrite protection of data of the data storage cartridges.

BACKGROUND OF THE INVENTION

Data storage cartridges may comprise rewritable media. Examples comprise magnetic tape media, various forms of optical disk media, magnetic disk media, various forms of optical tape media, and electronic memory media. In many instances, users desire to preserve data written to such rewritable media by protecting the data from being overwritten. The incorporated '846 and '803 patents allow protection of data written to data storage cartridges having rewritable media that is controlled by the data storage cartridges and that is tamper resistant. This allows the cartridges to be loaded in different data storage drives and the data is still protected. A write once flag is written to a lockable section of a cartridge memory, and the cartridge memory is locked. Additionally, a write once flag is written to a required data set of the rewritable media. Thus, write once flags are provided at both the locked section of the cartridge memory and the required data set of the rewritable media. The data storage drives are restricted by the write once flags and prevented from overwriting the protected data. Using the lockable section of the cartridge memory makes the protection tamper resistant. It is important that such cartridges (called WORM, write once-read many) are always protected.

A cartridge having such protection may not be available to a user at the time that the user finds it desirable to protect data against being overwritten. An example of protection of the data is discussed by the incorporated '810 patent which treats rewritable data storage media as write once by automatically advancing a write append limiter and operating the data storage drive to prevent changes to the data occurring before the write append limiter, and the incorporated '314 patent provides pointers at both the media and a cartridge memory to guard against tampering.

SUMMARY OF THE INVENTION

Methods and data storage drives provide cartridge-independent overwrite protection for removable, rewritable (non-WORM) data storage cartridges.

In one embodiment, a command structure is configured for operating cartridge data overwrite protection procedures for rewritable non-WORM cartridges independent of, or not withstanding, the absence of cartridge controls relating to data overwrite protection; and for such cartridges, the command structure responds to an allow data overwrite command to allow an immediately subsequent write type command to write to a cartridge even if the write command overwrites existing data. The configured command structure is enabled for the removable cartridge data storage drive.

In a further embodiment, the command structure allowed write type command may comprise a write data command with or without a command to locate to begin writing.

In another embodiment, the data storage drive data overwrite protection procedures comprise failing any write type command attempting to overwrite previously written data of the data storage cartridge, except for overwriting the write append limiter at the end of the previously written data.

In still another embodiment, the step of configuring the data storage drive command structure comprises establishing a mode page.

In a further embodiment, the step of enabling the command structure comprises placing an enable signal within the mode page.

In another embodiment, the data storage drive command structure additionally comprises the step of responding to a non-write type command immediately following the allow data overwrite command, resetting the data protection overwrite procedures, and a subsequent attempt to overwrite results in returning a failure check condition, posting a data protect sense key.

In still another embodiment, the data storage drive command structure additionally comprises the step of, once the immediately subsequent write type command is completed, resetting the data protection overwrite procedures.

In yet another embodiment, the data storage drive command structure step of allowing a write type command is applicable only to the partition of the data storage cartridge to which the allow data overwrite command is directed, such that the data protection overwrite procedures continue to apply to other partitions of the data storage cartridge.

Another embodiment comprises protecting against data overwrite of a rewritable data storage cartridge, comprising the steps of detecting whether a cartridge is non-WORM; operating cartridge data overwrite protection procedures for a non-WORM cartridge independent of the absence of cartridge controls of the rewritable data storage cartridge relating to data overwrite protection; and for such a non-WORM cartridge, the step of responding to an allow data overwrite command to allow an immediately subsequent write type command to write to the cartridge even if the write command overwrites existing data.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
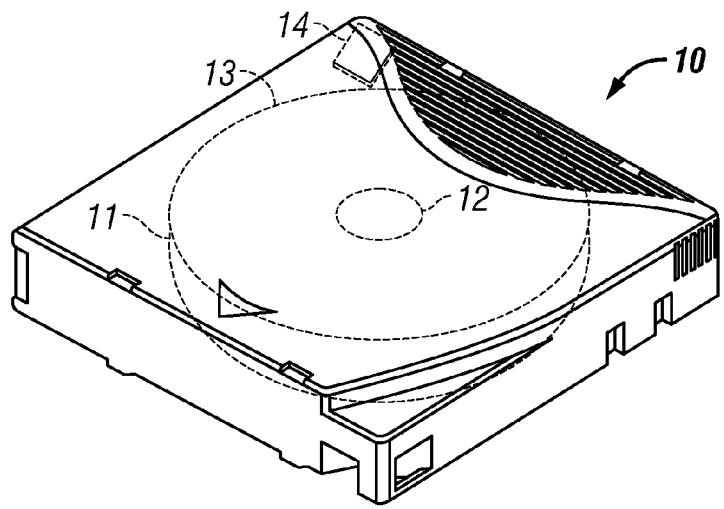
FIG. 1 is an isometric view of a removable data storage cartridge with a media, such as magnetic tape, and with a cartridge memory shown in phantom.

Referring to FIG. 1, an example of a data storage cartridge 10, such as a magnetic tape cartridge, is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory 14, for example, comprises a transponder having a contactless interface, which is retained in the cartridge 10, for example, by being encapsulated by the cartridge when it is assembled, as is understood by those of skill in the art. The illustrated magnetic tape cartridge is a single reel cartridge. Magnetic tape cartridges may also comprise dual reel cartridges in which the tape is fed between reels of the cartridge.

Figure 2:
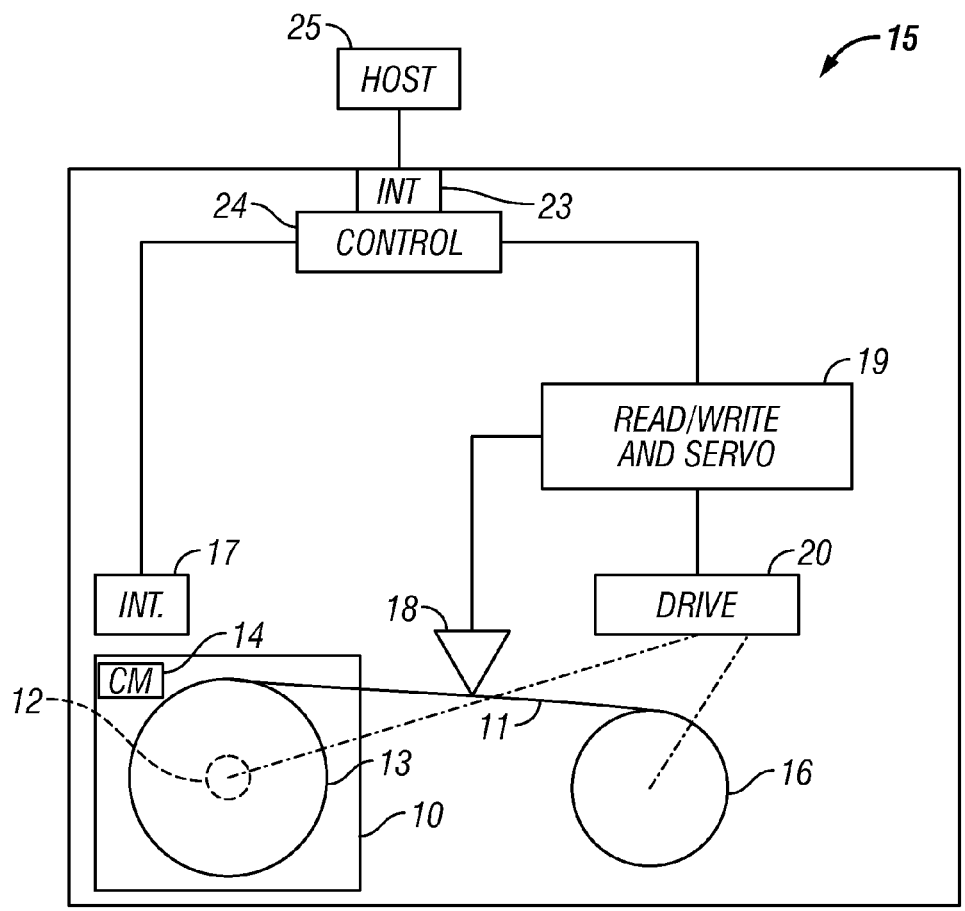
FIG. 2 is a block diagrammatic representation of a data storage drive for handling the removable data storage cartridge of FIG. 1, and which may implement aspects of the present invention.

Referring to FIG. 2, a magnetic tape drive 15 is illustrated. One example of a magnetic tape drive in which the present invention may be employed is the IBM 3580 Ultrium magnetic tape drive based on LTO technology, with microcode, etc., to perform desired operations with respect to the magnetic tape cartridge 10. In the instant example, the magnetic tape 11 is wound on a reel 13 in the cartridge 10, and, when loaded in the magnetic tape drive 15, is fed between the cartridge reel and a take up reel 16 in the magnetic tape drive. Alternatively, both reels of a dual reel cartridge are driven to feed the magnetic tape between the reels.

The magnetic tape drive comprises a memory interface 17 for reading information from, and writing information to, the cartridge memory 14 of the magnetic tape cartridge 10. A read/write system is provided for reading and writing information to the magnetic tape, and, for example, may comprise a read/write and servo head system 18 with a servo system for moving the head laterally of the magnetic tape 11, a read/write servo control 19, and a drive motor system 20 which moves the magnetic tape 11 between the cartridge reel 13 and the take up reel 16 and across the read/write and servo head system 18. The read/write and servo control 19 controls the operation of the drive motor system 20 to move the magnetic tape 11 across the read/write and servo head system 18 at a desired velocity, and, in one example, determines the location of the read/write and servo head system with respect to the magnetic tape 11. In one example, the read/write and servo head system 18 and read/write and servo control 19 employ servo signals on the magnetic tape 11 to determine the location of the read/write and servo head system, and in another example, the read/write and servo control 19 employs at least one of the reels, such as by means of a tachometer, to determine the location of the read/write and servo head system with respect to the magnetic tape 11. The read/write and servo head system 18 and read/write and servo control 19 may comprise hardware elements and may comprise any suitable form of logic, including a processor operated by software, or microcode, or firmware, or may comprise hardware logic, or a combination.

An interface 23 provides communication with respect to one or more host systems or tool processors 25, and is configured to receive and to send information externally of the data storage drive. Alternatively, the magnetic tape drive 15 may form part of a subsystem, such as a library, and may also receive commands from the subsystem, also at interface 23.

A control 24 communicates with the host interface 23, with memory interface 17, and communicates with the read/write system, e.g., at read/write and servo control 19. The control 24 may comprise any suitable form of logic, including one or more processors operated by software, or microcode, or firmware, or may comprise hardware logic, or a combination.

The illustrated and alternative embodiments of magnetic tape drives are known to those of skill in the art, including those which employ dual reel cartridges.

Other types of removable data storage cartridges and data storage drives are known to those of skill in the art. Examples comprise optical disk cartridges and drives, optical tape cartridges and drives, removable computer diskettes and drives, rigid magnetic disk cartridges and drives, etc.

The control 24 typically communicates with the one or more host systems 25, tool or subsystem via interface 23, and operates the magnetic tape drive 15 in accordance with commands originating at the host, etc., and also responds to commands from the subsystem.

As illustrated, the magnetic tape drive 15 provides information to the magnetic tape 11 of the magnetic tape cartridge 10.

Figure 3:
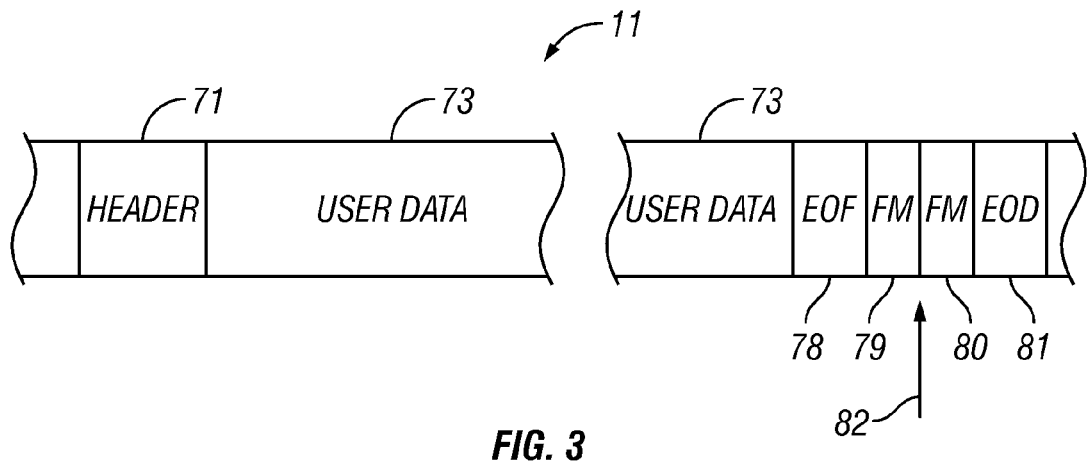
FIG. 3 is a diagrammatic representation of information provided on a magnetic tape.

Referring to FIG. 3, a magnetic tape 11 may be organized in many ways. Typically, a magnetic tape is arranged with parallel tracks, and may also be arranged with several parallel wraps of groups of parallel tracks. In one example, the magnetic tape is moved longitudinally in a first direction while the head system reads and/or writes data with respect to one wrap, and is reversed to be moved in the opposite direction and the head system is shifted to another wrap.

Referring to FIG. 3, the information is shown laid out as a portion of a single wrap of magnetic tape 11 for the purpose of illustration. Typical constructs include a header 71 at the beginning, for example, of a file, followed by user data 73. A trailer 78, such as at the end of a user file, may indicate the end of a file and, for example, comprise a filemark 79, and the end of data may comprise a number of additional filemarks 80 and an end of data marker 81.

In the example of FIG. 3, a pointer 82 indicates the position at the end of the user data 73 and prior to the end of data constructs. Those of skill in the art will envision similar constructs for other examples of magnetic tape or for other types of data storage cartridges.

As discussed above, in many instances, users desire to preserve data written to such rewritable media by protecting the data from being overwritten. The incorporated '846 and '803 patents allow protection of data written to data storage cartridges having rewritable media that is controlled by the data storage cartridges and that is tamper resistant. This allows the cartridges to be loaded in different data storage drives and the data is still protected. Referring to FIG. 1, a write once flag is written to a lockable section of cartridge memory 14, and the cartridge memory is locked. Additionally, a write once flag is written to a required data set of the rewritable media 11. Thus, write once flags are provided at both the locked section of the cartridge memory and the required data set of the rewritable media. The data storage drives are restricted by the write once flags and prevented from overwriting the protected data. Using the lockable section of the cartridge memory makes the protection tamper resistant. Such a cartridge may be termed a WORM or "write once-read many" cartridge.

The cartridges are typically initialized to have the WORM protection, but an initialized cartridge having such protection may not be available to a user at the time that the user finds it desirable to protect data against being overwritten. On the other hand, all or part of the data stored on a non-WORM cartridge may have lost its usefulness, and it may be desirable to reclaim the cartridge or a partition of the cartridge to store new data.

The present invention allows a user to take control over the data protection of a non-WORM cartridge at the data storage drive. In one embodiment, the control over the data protection is by a command structure of the data storage drive.

Figure 4:
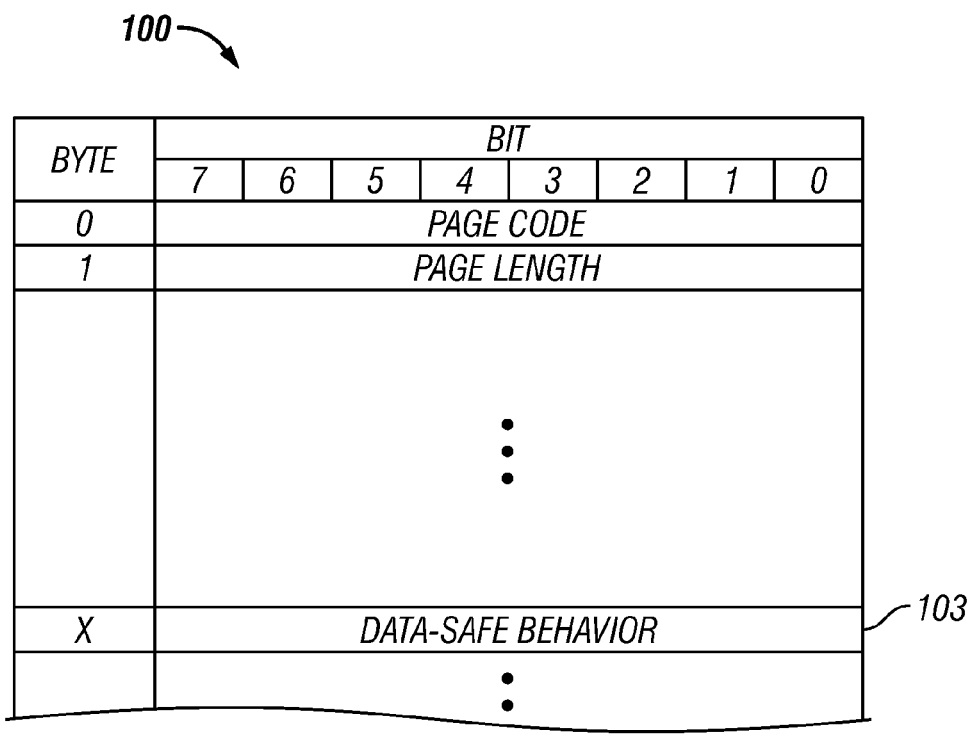
FIG. 4 is a diagrammatic representation of information of a command structure, for example that may be provided to a data storage drive.

Referring to FIG. 4, an example of a command structure 100, such as a mode page, is illustrated having information in accordance with embodiments of the present invention. A mode page is the data accompanying a Mode Select command that is sent from the host or a tool processor to the data storage drive at any time. A mode page and Mode Select command comprise one of many embodiments of a command structure. A setting 103 may enable or disable an existing command structure, or the enable or disable setting 103 may be within the data at the time the command structure data is provided. Per normal behavior, such as SCSI, the command structure 100 and setting 103 may be saved either to non-volatile memory or to volatile memory of control 24 of FIG. 2. If the setting is saved in non-volatile memory, then this setting is remembered always, even across power cycles and will remain set until explicitly changed by another Mode Select command. If the command structure and setting are only in volatile memory, then they remain only until a power cycle or until explicitly changed by another Mode Select command.

Figure 5:
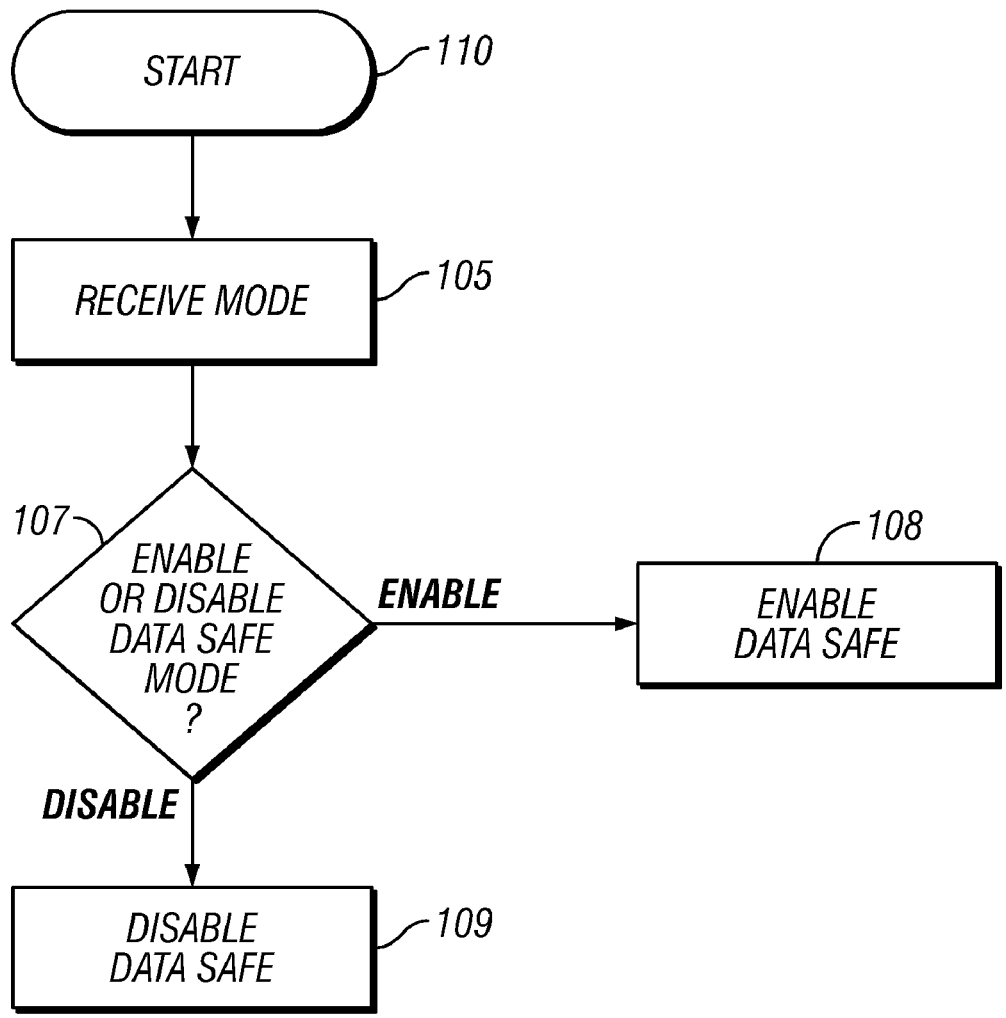
FIG. 5 is a flow chart depicting the provision and enabling of the command structure of FIG. 4.

FIG. 5 illustrates embodiments of the process to provide and enable the command structure 100 of FIG. 4, beginning at step 110. The host or tool processor 25 of FIG. 2 provides the Mode Select command which comprises the command structure 100 of FIG. 4, or alternatively comprises an enable signal subsequent to receipt of the command structure.

Referring to FIGS. 2, 4 and 5, the command structure or Mode Select command is received at the interface 23 in step 105, and step 107 inserts the command structure 100 in the desired memory (volatile or non-volatile) of control 24. In one embodiment, the command structure is enabled 108 by an enable signal provided with the command structure, or disabled 109 by a disable signal provided with the command structure 100, either indicated by setting 103. Alternatively, the enable 108 signal 103 is activated subsequent to receipt of the command structure 100, for example, by another Mode Select command. A preferred embodiment is to provide the command structure as a mode page 100 with the enable signal 103 with the mode page.

The function of the command structure 100 is to operate cartridge data overwrite protection procedures for rewritable non-WORM cartridges independent of, or not withstanding, the absence of cartridge controls, comprising preventing any overwrites of previously written data. Thus, the data written to a cartridge which is not a WORM cartridge is still protected against being overwritten. Alternatively the procedures may be implemented directly at the data storage drive by control 24 of FIG. 2.

Figure 6:
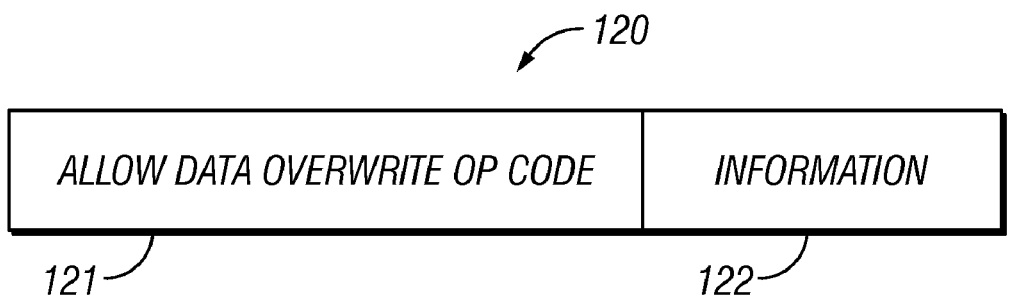
FIG. 6 is a diagrammatic representation of a command provided to the data storage drive of FIG. 2.

FIG. 6 illustrates a special command in which the data storage drive controls the rewritable non-WORM cartridge by allowing data of the cartridge to be overwritten. The special command is an "allow data overwrite" command 120 that can be implemented by the command structure 100 of FIG. 4. The "allow data overwrite" command 120 comprises, for example, an op code 121 not used by any other command, such as SCSI commands. As with respect to all commands, the op code is accompanied by information 122 which may detail aspects of the command, such as identifying the partition of data stored on the data storage cartridge to which the command applies. Once the command 120 is received by the data storage drive, if, and only if, it is immediately followed by a write type command, comprising an immediately subsequent command, the write type command will be allowed to overwrite any data of the partition, or of the cartridge. If, instead, the "allow data overwrite" command 120 is followed by a non-write type command, the "allow data overwrite" function is reset, and a subsequent attempt to overwrite results in returning a failure check condition, posting a data protect sense key.

In one embodiment, the allowed write type command comprises a write command with or without a command to locate to begin writing. The locate must be associated with the write command.

In one embodiment, a sequence of commands may commence immediately after the special command 120. As an example, as the result of the immediately subsequent write type command, if for magnetic tape, the overwrite itself effectively deletes any previous data and the write append limiter following the location of the write command. Thus, the write command and all directly following write commands are executed and the last command establishes a new write append limiter.

Once the immediately subsequent write type command is completed, the data protection overwrite procedures reset.

In one embodiment, the allow data overwrite command specifies the location that an overwrite is allowed. In the event that the cartridge comprises a plurality of partitions, and the allow data overwrite command 120 specifies the partition in which it is to be effective, the allowed write type command is applicable only to the partition to which the write type command is directed, such that the data protection overwrite procedures continue to apply to other partitions of the data storage cartridge. Alternatively, the allow data overwrite command may authorize a complete reformat of the medium, for example, by changing the number and/or size of the partitions.

Referring to FIG. 3, in one embodiment, the data storage drive data overwrite protection procedures comprise failing any write type command attempting to overwrite previously written data of the data storage cartridge, except for overwriting a write append limiter, such as the extra filemark 80 and end of data indicator 81 at the end of the previously written data. This allows additional data to be appended at the end of the previously written data.

Figure 7:
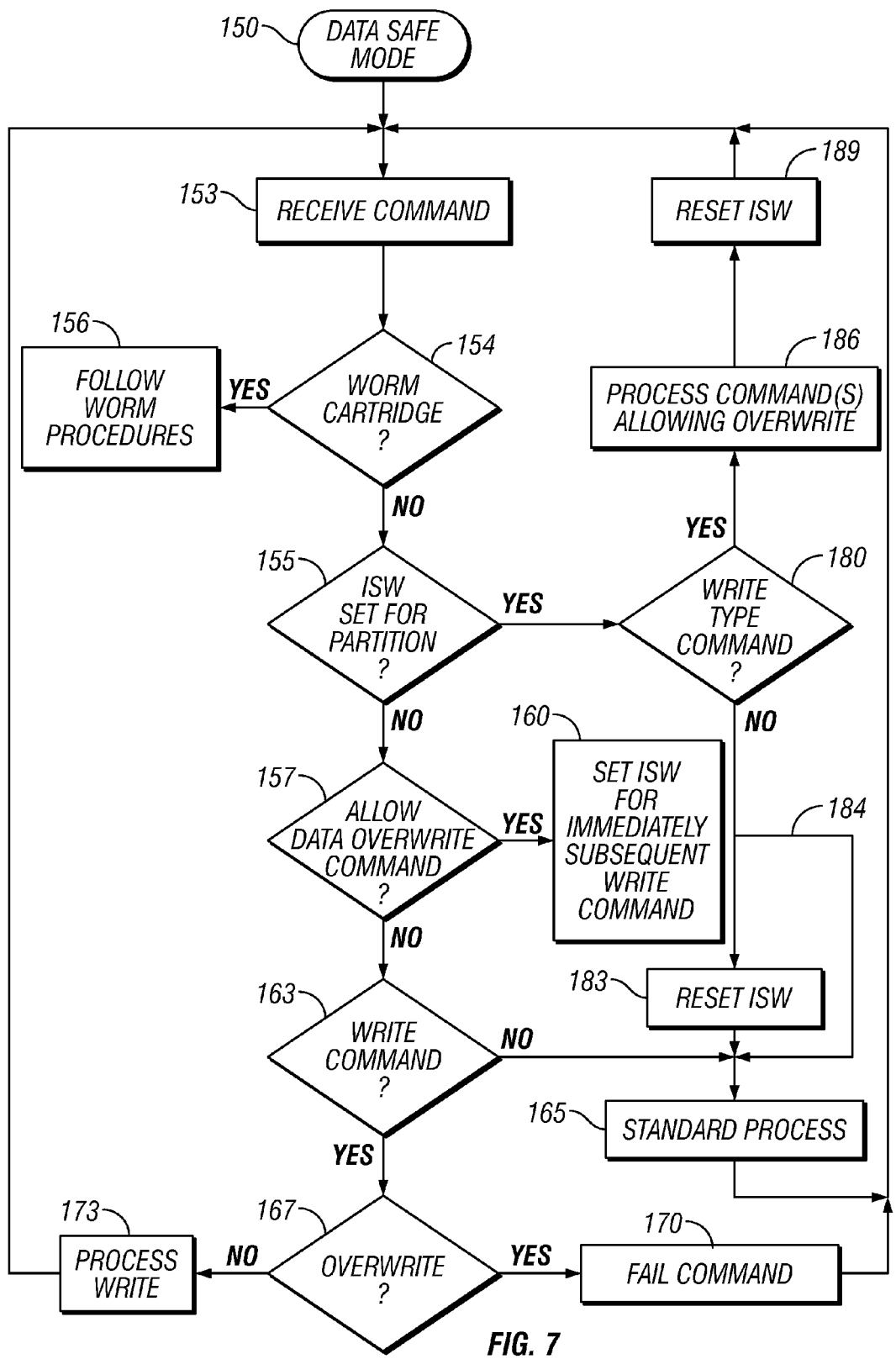
FIG. 7 is a flow chart depicting an exemplary method of operating the data storage drive of FIG. 2.

An example of the procedures of the enabled command structure and allow data overwrite command are illustrated in FIG. 7. Referring to FIGS. 4, 6 and 7, the enabled command structure may be called a "data safe mode", and is entered at step 150. A command is received at step 153 and step 154 determines whether the data storage cartridge mounted on the drive has cartridge write controls, i.e. is a WORM cartridge. This may be done by checking the cartridge memory 14 or reading a flag or other indication from the media 11. If the cartridge is WORM, it is handled following cartridge write control procedures for WORM in step 156. If the cartridge is not a WORM cartridge, step 155 determines whether the allow data overwrite command has been received in the immediately preceding command. One way of tracking is to have the allow data overwrite command to set an "immediately subsequent write" (ISW) trigger. The trigger may be set for a particular partition. Step 155 checks for that trigger. Alternative methods for determining whether the allow data overwrite has been received as the immediately preceding command are also usable in step 155.

If the immediately subsequent write is not set, step 157 looks for an allow data overwrite command. If the command is the allow data overwrite, the command structure is expecting that the immediately subsequent command will be a write type command. One way of indicating this expectation is to set the immediately subsequent write (ISW) trigger in step 160, as discussed above.

If, however, the received command is not an allow data overwrite command, step 163 looks for a write command. If the command is other than a write command, it is processed normally in step 165. The process then looks for the next command at step 153.

If the command is a write command, data overwrite protection step 167 determines whether the write command, if allowed, will overwrite previously written data of the data storage cartridge, as discussed above. If so, step 170 fails the command, for example, returning a failure check condition, posting a data protect sense key, in accordance with the applicable protocol. The process may then look for the next command at step 153. If protocol of the command structure allows a write command that does not result in an overwrite, step 167 proceeds to step 173 to process the acceptable write command. An example of an acceptable write command that will not result in an overwrite of previously written data is a write command that appends data to the end of the previously written data. As discussed above, the command may overwrite a write append limiter, such as the extra filemark 80 and end of data indicator 81 at the end of the previously written data, as shown in FIG. 3. The process then looks for the next command at step 153.

Referring back to step 155, if the step indicates that the allow data overwrite has been received as the immediately preceding command, "YES", step 180 determines whether the present command is a write type command. If not, the data protection overwrite procedures reset in step 183. In one embodiment, the immediately subsequent write (ISW) trigger is reset.

The non-write type command may then be processed normally in step 165. The process then looks for the next command at step 153.

Since the command immediately subsequent to the special allow data overwrite command was not a write type command, step 183 of the command structure in effect voids the allow data overwrite command and provides continued protection of the previously written data.

In one embodiment, not every non-write command resets the immediately subsequent write trigger of step 183. For example, only non-write type commands that affect writing reset the ISW. As known to those of skill in the art, commands such as change position, change block size, etc., affect writes. Commands such as inquiry do not affect writes, and would not reset the ISW of step 183. The command is processed in step 165, bypassing step 183 as shown by path 184.

If the allow data overwrite command was the immediately preceding command as indicated by step 155, and the present immediately subsequent command is a write type command as indicated by step 180, the write type command is allowed to be processed in step 186 to write to the cartridge even if the write command overwrites existing data. As discussed above, if the overwrite is of magnetic tape, the overwrite itself has the effect of eliminating the data following the overwrite to the previous end of data for the partition. Thus, any continued writing is as though the data were a normal append of step 173. The overwrite and any appends must then end with a new end of data, such as a new write append limiter.

Once the immediately subsequent write type command (or sequence of commands) is completed, the data protection overwrite procedures reset in step 189. In one embodiment, the immediately subsequent write (ISW) trigger is reset. The process then looks for the next command at step 153. Step 189 of the command structure in effect voids the allow data overwrite command with respect to any commands following completion of the overwrite of step 186 and reestablishes continued protection of the newly written data, and any data that was not overwritten.

Alternative protocols and procedures than that illustrated in FIG. 7 may be employed to provide the function of cartridge-independent data protection for rewritable data storage cartridges, involving operating cartridge data overwrite protection procedures independent of cartridge controls relating to data overwrite protection; and responding to an allow data overwrite command to allow an immediately subsequent write type command to write to the cartridge even if said write command overwrites existing data.

The implementations may involve software, firmware, micro-code, hardware and/or any combination thereof. The implementation may take the form of code or logic implemented in a medium, such as memory, storage and/or circuitry of control 24 of FIG. 2, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for controlling a removable cartridge data storage drive, comprising:
 configuring a data storage drive command structure for cartridge-independent data protection for rewritable non-WORM data storage cartridges, said command structure comprising:
  operating cartridge data overwrite protection procedures for rewritable non-WORM cartridges independent of the absence of cartridge controls relating to data overwrite protection; and
  for said rewritable non-WORM cartridges, responding to an allow data overwrite command to allow an immediately subsequent write type command to write to said cartridge even if said write command overwrites existing data; and enabling said command structure for said removable cartridge data storage drive.

2. The method of claim 1, wherein said command structure allowed write type command comprises a write command with or without a command to locate to begin writing.

3. The method of claim 1, wherein said data storage drive data overwrite protection procedures comprise:
failing any write type command attempting to overwrite previously written data of said data storage cartridge, except for overwriting a write append limiter at the end of said previously written data.

4. The method of claim 1, wherein said step of configuring said data storage drive command structure comprises establishing a mode page.

5. The method of claim 4, wherein said step of enabling said command structure comprises placing an enable signal within said mode page.

6. A method for controlling a removable cartridge data storage drive, comprising:
configuring a data storage drive command structure for cartridge-independent data protection for rewritable non-WORM data storage cartridges, said command structure comprising:
operating cartridge data overwrite protection procedures for rewritable non-WORM cartridges independent of the absence of cartridge controls relating to data overwrite protection;
for said rewritable non-WORM cartridges, responding to an allow data overwrite command to allow an immediately subsequent write type command to write to said cartridge even if said write command overwrites existing data; and
responding to a non-write type command immediately following said allow data overwrite command, resetting said data protection overwrite procedures such that a subsequent attempt to overwrite results in returning a failure check condition, posting a data protect sense key; and
enabling said command structure for said removable cartridge data storage drive.

7. The method of claim 1, wherein said data storage drive command structure additionally comprises the step of:
once said immediately following write type command is completed, said data protection overwrite procedures reset.

8. The method of claim 1, wherein said data storage drive command structure step of allowing a write type command is applicable only to the partition of said data storage cartridge to which said allow data overwrite command is directed, such that said data protection overwrite procedures continue to apply to other partitions of said data storage cartridge.

9. A method for protecting against data overwrite of a rewritable non-WORM data storage cartridge, comprising:
detecting whether a data storage cartridge is a rewritable non-WORM cartridge;
operating cartridge data overwrite protection procedures independent of the absence of cartridge controls of said rewritable non-WORM data storage cartridge relating to data overwrite protection; and
responding to an allow data overwrite command to allow an immediately subsequent write type command to write to said cartridge even if said write command overwrites existing data.

10. The method of claim 9, wherein said allowed write type command may comprise a write command with or without a command to locate to begin writing.

11. The method of claim 9, wherein said data storage drive data overwrite protection procedures comprise:
failing any write type command attempting to overwrite previously written data of said data storage cartridge, except for overwriting said write append limiter at the end of said previously written data.

12. A method for protecting against data overwrite of a rewritable non-WORM data storage cartridge, comprising:
detecting whether a data storage cartridge is a rewritable non-WORM cartridge;
operating cartridge data overwrite protection procedures independent of the absence of cartridge controls of said rewritable non-WORM data storage cartridge relating to data overwrite protection; and
responding to an allow data overwrite command to allow an immediately subsequent write type command to write to said cartridge even if said write command overwrites existing data; and
responding to a non-write type command immediately following said allow data overwrite command, resetting said data protection overwrite procedures such that a subsequent attempt to overwrite results in returning a failure check condition, posting a data protect sense key.

13. The method of claim 9, additionally comprising the step of:
once said immediately following write type command is completed, resetting said data protection overwrite procedures.

14. The method of claim 9, wherein said step of allowing a write type command is applicable only to the partition of said data storage cartridge to which said allow data overwrite command is directed, such that said data protection overwrite procedures continue to apply to other partitions of said data storage cartridge.

15. A removable cartridge data storage drive, comprising:
read/write apparatus configured to read and to write information with respect to a data storage cartridge loaded in said data storage drive;
drive apparatus configured to provide relative motion between media of said loaded data storage cartridge and said read/write apparatus, and to provide locate functions with respect to said media and said read/write apparatus, to effect said reading and writing of information by said read/write apparatus with respect to said loaded data storage cartridge;
at least one interface configured to receive and to send information externally of said data storage drive; and
a control configured to respond to commands received at said at least one interface, and to operate said read/write apparatus and said drive apparatus, said control configured to protect against data overwrite of rewritable non-WORM data storage cartridges, comprising:
operating cartridge data overwrite protection procedures for rewritable non-WORM cartridges independent of the absence of cartridge controls of said rewritable data storage cartridge relating to data overwrite protection; and
for said rewritable non-WORM cartridges, responding to an allow data overwrite command to allow an immediately subsequent write type command to write to said cartridge even if said write command overwrites existing data.

16. The removable cartridge data storage drive of claim 15, wherein said allowed write type command may comprise a write data command with or without a command to locate to begin writing.

17. The removable cartridge data storage drive of claim 15, wherein said data storage drive data overwrite protection procedures of said control comprise:

failing any write type command attempting to overwrite previously written data of said data storage cartridge, except for overwriting said write append limiter at the end of said previously written data.

18. A removable cartridge data storage drive, comprising:

read/write apparatus configured to read and to write information with respect to a data storage cartridge loaded in said data storage drive;

drive apparatus configured to provide relative motion between media of said loaded data storage cartridge and said read/write apparatus, and to provide locate functions with respect to said media and said read/write apparatus, to effect said reading and writing of information by said read/write apparatus with respect to said loaded data storage cartridge;

at least one interface configured to receive and to send information externally of said data storage drive; and a control configured to respond to commands received at said at least one interface, and to operate said read/write apparatus and said drive apparatus, said control configured to protect against data overwrite of rewritable non-WORM data storage cartridges, comprising:

operating cartridge data overwrite protection procedures for rewritable non-WORM cartridges independent of the absence of cartridge controls of said rewritable data storage cartridge relating to data overwrite protection;

for said rewritable non-WORM cartridges, responding to an allow data overwrite command to allow an immediately subsequent write type command to write to said cartridge even if said write command overwrites existing data; and respond to a non-write type command immediately following said allow data overwrite command, resetting said data protection overwrite procedures such that a subsequent attempt to overwrite results in returning a failure check condition, posting a data protect sense key.

19. The removable cartridge data storage drive of claim 15, wherein said control is additionally configured to:

once said immediately following write type command is completed, reset said data protection overwrite procedures.

20. The removable cartridge data storage drive of claim 15, wherein said control is configured to: allow said a write type command only for the partition of said data storage cartridge to which said allow data overwrite command is directed, such that said data protection overwrite procedures continue to apply to other partitions of said data storage cartridge.

21. A data storage drive configured to read and write data with respect to rewritable data storage cartridges, comprising:

read/write apparatus configured to read and to write information with respect to a data storage cartridge loaded in said data storage drive;

drive apparatus configured to provide relative motion between media of said loaded data storage cartridge and said read/write apparatus, and to provide locate functions with respect to said media and said read/write apparatus, to effect said reading and writing of information by said read/write apparatus with respect to said loaded data storage cartridge;

at least one interface configured to receive and to send information externally of said data storage drive; and a control configured to respond to commands received at said at least one interface, and to operate said read/write apparatus and said drive apparatus, said control configurable in accordance with a command structure received at said at least one interface, said command structure comprising:

detecting whether a data storage cartridge is a rewritable non-WORM cartridge;

for a rewritable non-WORM cartridge, operating cartridge data overwrite protection procedures independent of the absence of cartridge controls relating to data overwrite protection; and for said rewritable non-WORM cartridge, responding to an allow data overwrite command to allow an immediately subsequent write type command to write to said cartridge even if said write command overwrites existing data.

22. The data storage drive of claim 21, wherein said command structure received at said interface comprises a mode page.

23. The data storage drive of claim 22, wherein said command structure is enabled by an enable signal within said mode page.

24. The data storage drive of claim 23, wherein said enable signal is provided with said mode page.

25. The data storage drive of claim 23, wherein said enable signal is activated subsequent to said receipt of said mode page.

\* \* \* \* \*